(12) United States Patent
Marsden et al.

(10) Patent No.: US 6,890,371 B2
(45) Date of Patent: *May 10, 2005

(54) METHOD FOR PROCESSING ELEMENTAL SULFUR-BEARING MATERIALS USING HIGH TEMPERATURE PRESSURE LEACHING

(75) Inventors: John O. Marsden, Phoenix, AZ (US); Robert E. Brewer, Safford, AZ (US); Joanna M. Robertson, Thatcher, AZ (US); Wayne W. Hazen, Lakewood, CO (US); Philip Thompson, West Valley City, UT (US); David R. Baughman, Golden, CO (US)

(73) Assignee: Phelps Dodge Corporation, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/328,633

(22) Filed: Dec. 23, 2002

(65) Prior Publication Data

US 2003/0086849 A1 May 8, 2003

Related U.S. Application Data

(63) Continuation of application No. 09/912,945, filed on Jul. 25, 2001, now Pat. No. 6,497,745.
(60) Provisional application No. 60/220,677, filed on Jul. 25, 2000.

(51) Int. Cl.[7] .............................. C01B 17/69; C22B 3/06
(52) U.S. Cl. ............................ 75/743; 75/743; 423/522
(58) Field of Search ................... 75/743, 744; 423/522

(56) References Cited

U.S. PATENT DOCUMENTS

| | | | | |
|---|---|---|---|---|
| 4,605,439 A | * | 8/1986 | Weir ........................... | 75/744 |
| 6,451,088 B1 | * | 9/2002 | Marsden et al. .............. | 75/739 |
| 6,497,745 B2 | * | 12/2002 | Marsden et al. .............. | 75/743 |
| 6,626,979 B2 | * | 9/2003 | Marsden et al. .............. | 75/739 |
| 6,676,909 B2 | * | 1/2004 | Marsden et al. .............. | 423/28 |
| 6,680,034 B2 | * | 1/2004 | Marsden et al. .............. | 423/24 |

OTHER PUBLICATIONS

PCT/US01/23469, International Preliminary Examination Report.

* cited by examiner

*Primary Examiner*—Melvyn Andrews
(74) *Attorney, Agent, or Firm*—Snell & Wilmer, LLP

(57) ABSTRACT

The present invention relates generally to a process for the production of sulfuric acid and liberation of precious metal values from materials containing sulfur through pressure leaching operations. In accordance with various aspects of the present invention, the sulfur-bearing materials may comprise residues from pressure leaching operations, such as those carried out at medium temperatures. The process of the present invention can be advantageously used to convert such sulfur-bearing materials to sulfuric acid by means of pressure leaching. The sulfuric acid so produced can be used beneficially in other mineral processing operations, for example those at the site where it is produced. Metals, such as precious metals, that are contained within the sulfur-bearing materials advantageously may be recovered from processing products by established precious metals recovery technology.

18 Claims, 2 Drawing Sheets

METHOD FOR PROCESSING ELEMENTAL SULFUR-BEARING MATERIALS USING HIGH TEMPERATURE PRESSURE LEACHING

CROSS-REFERENCE TO RELATED APPLICATIONS

This application claims priority to and is a continuation of U.S. patent application Ser. No. 09/912,945 now U.S. Pat. No. 6,497,745 entitled "Method for Processing Elemental Sulfur-Bearing Materials Using High Temperature Pressure Leaching" filed on Jul. 25, 2001, which claims priority to U.S. Provisional Patent Application, Ser. No. 60/220,677 entitled "Methods for Conversion of Sulfur-bearing Material to Sulfuric Acid and Recovery of Associated Metals by High Temperature Pressure Oxidation" filed on Jul. 25, 2000, both of which are incorporated by reference herein.

FIELD OF INVENTION

The present invention relates generally to a process for manufacturing sulfuric acid, and more specifically, to a process for manufacturing relatively dilute sulfuric acid from sulfur-bearing materials using high temperature pressure leaching processes and recovering metal values from the sulfur-bearing materials.

BACKGROUND OF THE INVENTION

Hydrometallurgical treatment of copper containing materials, such as copper ores, concentrates, and the like, has been well established for many years. Currently, there exist many creative approaches to the hydrometallurgical treatment of these materials. The recovery of copper from copper sulfide concentrates using pressure leaching promises to be particularly advantageous.

The mechanism by which pressure leaching releases copper from a sulfide mineral matrix, such as chalcopyrite, is generally dependent on temperature, oxygen availability, and process chemistry. In high temperature pressure leaching, typically thought of as being pressure leaching at temperatures above about 200° C., the dominant leaching reaction in dilute slurries may be written as follows:

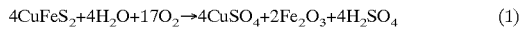

$$4CuFeS_2 + 4H_2O + 17O_2 \rightarrow 4CuSO_4 + 2Fe_2O_3 + 4H_2SO_4 \quad (1)$$

During pressure leaching of copper sulfide concentrates, such as chalcopyrite containing concentrates at medium temperatures (e.g., at temperatures in the range of between about 140° C. to about 180° C.), however, a significant fraction of the sulfide converts to elemental sulfur (S°) rather than sulfate ($SO_4^{-2}$). According to the reaction:

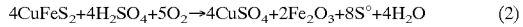

$$4CuFeS_2 + 4H_2SO_4 + 5O_2 \rightarrow 4CuSO_4 + 2Fe_2O_3 + 8S° + 4H_2O \quad (2)$$

For example, experimental results show that at about 160° C. and about 100 psi oxygen overpressure in the pressure leaching vessel, from about 60 to about 70 percent of the sulfur in the super-finely ground copper sulfide concentrate is converted to elemental sulfur, with the remainder being converted to sulfate.

Elemental sulfur is a hydrophobic substance. In the pressure leaching process slurry, under certain temperature and solution conditions, sulfur has a tendency to agglomerate. Moreover, molten elemental sulfur becomes highly viscous at elevated temperatures. For example, the viscosity of molten sulfur increases from less than 100 centipoise at 150° C. to more than 90,000 centipoise at 185° C. As such, the molten sulfur may tend to encapsulate metal values in the process slurry, including precious metals and unreacted metal sulfides, and/or stick to various parts of any apparatus in which processing operations on the molten sulfur are performed. Encapsulation of the metal values, for example, copper, precious metals and the like, tends to make subsequent recovery of such metal values extremely difficult using conventional processing techniques. As discussed in applicant's co-pending application entitled "Method for Recovery of Metals From Metal Containing Materials Using Medium Temperature Pressure Leaching" filed Jul. 25, 2001 and assigned U.S. Pat. Ser. No. 09/915,105, the subject matter of which is hereby incorporated herein by reference, while pressure leaching under medium temperature conditions offers many advantages, prior medium temperature pressure leaching processes characteristically have suffered from incomplete metal (e.g., copper) extraction resulting from either passivation of the metal sulfide particle surfaces or by the metal sulfide particles becoming coated with molten elemental sulfur. As discussed in greater detail in applicant's co-pending application, proper control of such pressure leaching processes, as described therein, enables the formation of elemental sulfur in addition to the desired metal recovery (e.g., copper). However, recovery of metal values that may be contained in the elemental sulfur-containing residue, such as, for example, precious metals, may be difficult with use of conventional techniques, and as such they may be lost. Moreover, if the acid produced by such processing techniques could not be used at the site where the recovery was performed, costs would be incurred in connection with transportation of the residue or handling of the acid. An effective and efficient method to manufacture sulfuric acid from sulfur-bearing material, particularly elemental sulfur-containing residue resulting from pressure leaching operations operated at medium temperatures (e.g., about 140° C. to about 180° C.) is needed. Moreover, an effective and efficient method to enhance recovery of any metal values encapsulated within the sulfur-bearing material would be advantageous.

SUMMARY OF THE INVENTION

While the way in which the present invention addresses the deficiencies and disadvantages of the prior art is described in greater detail hereinbelow, in general, according to various aspects of the present invention, a process for manufacturing sulfuric acid includes pressure leaching of sulfur-bearing materials, preferably at high temperatures, not only to facilitate the recovery of a sulfuric acid solution, but also to enhance recovery of metal values contained in the sulfur-bearing materials. The acid produced, preferably a relatively dilute sulfuric acid solution advantageously can be used in other metal extraction processes, often with significant cost savings.

As will be described in greater detail hereinbelow, the methods and processes of the present invention are particularly suited for use in connection with sulfur-bearing materials comprising residues from pressure leaching operations, such as, for example, those operated at medium temperatures (e.g., about 140° to about 180° C.).

In accordance with an exemplary embodiment of the present invention, a process for manufacturing sulfuric acid from sulfur-bearing materials generally includes the steps of: (i) providing a feed stream containing a sulfur-bearing material, and (ii) subjecting the sulfur-bearing material feed stream to high temperature pressure leaching in a pressure leaching vessel, optionally in the presence of a suitable dispersing agent. In accordance with a preferred aspect of this embodiment of the invention, the sulfur-bearing material feed stream comprises residue from medium temperature pressure leaching of a copper sulfide mineral, such as chalcopyrite or a blend of that residue combined with elemental sulfur. In accordance with a further preferred aspect of this embodiment of the invention, the use of a dispersing agent during pressure leaching may aid in alleviating processing problems caused by the high viscosity and hydrophobic nature of elemental sulfur at higher temperatures (e.g., above about 160° C.).

In accordance with a further aspect of this embodiment of the present invention, metal values contained in the sulfur-bearing material feed stream are liberated from the elemental sulfur residue during pressure leaching, during which the elemental sulfur is converted to sulfuric acid, and then separated from, the resultant acid stream and subjected to metal recovery processing. Such metal recovery processing may include precious metal recovery.

The present inventors have advanced the art of copper hydrometallurgy by recognizing the advantages of not only producing a sulfuric acid solution from sulfur-bearing materials, such as the elemental sulfur by-product of medium temperature pressure leaching of copper sulfide minerals, but also of enabling the recovery of metal values (e.g., precious metals) entrained therein, which otherwise may have been lost.

These and other advantages of a process according to various aspects of the present invention will be apparent to those skilled in the art upon reading and understanding the following detailed description with reference to the accompanying figures.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION

The present invention exhibits significant advancements over prior art processes, particularly with regard to process efficiency and process economics. Moreover, existing metal (e.g., copper) recovery processes that utilize conventional atmospheric or pressure leaching/solvent extraction/electrowinning process sequences may, in many instances, be easily retrofitted to exploit the many commercial benefits the present invention provides.

Figure 1:
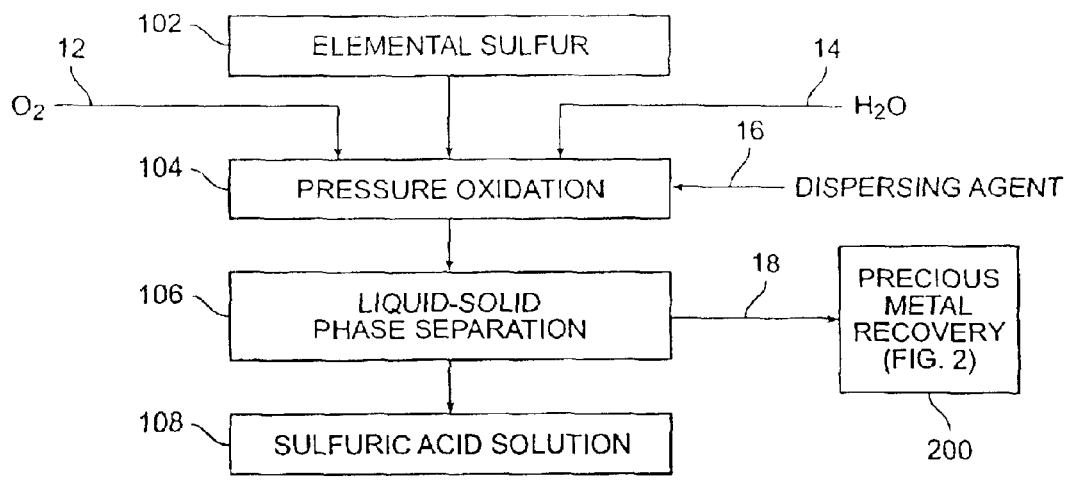
FIG. 1 illustrates a flow diagram of a process in accordance with an exemplary embodiment of the present invention.

Referring now to FIG. 1, in accordance with various aspects of one embodiment of the present invention, a sulfuric acid production process preferably involves providing a sufficient supply of a sulfur-bearing material 102. In the context of the present invention, the term "sulfur-bearing material" refers to elemental sulfur, elemental sulfur-bearing material generated as a by-product of other metal recovery processes, materials containing iron sulfides, copper sulfides and/or other metal sulfides, or any combination of these. In addition, the term "sulfur-bearing material" refers to other sulfur compositions that may include sulfur together with any other sulfides and/or metals that might be attendant to or part of such sulfur compositions. For purposes of this disclosure, in most instances, the term "elemental sulfur," for example as that term is used in FIG. 1, is used interchangeably with the term "sulfur-bearing material," inasmuch as, as will be clear from the following disclosure, the elemental sulfur and sulfide sulfur components of any sulfur-bearing material 102 are advantageously converted to sulfuric acid in accordance with the present invention.

In accordance with one aspect of a preferred embodiment of the present invention, sulfur-bearing material feed stream 102 preferably comprises the sulfur-containing residue produced in connection with the pressure leaching of copper-containing material feed streams. As explained in greater detail in Applicant's co-pending application, U.S. Pat. Ser. No. 09/915,105, such copper-containing materials include copper sulfide ores, such as, for example, ores and/or concentrates containing chalcopyrite ($CuFeS_2$) or mixtures of chalcopyrite with one or more of chalcocite ($Cu_2S$), bornite ($Cu_5FeS_4$), and covellite (CuS). The sulfur-containing residues that result from the pressure leaching of such copper-containing material feed streams may advantageously be processed in accordance with the various aspects of the present invention.

Sulfur-bearing material feed stream 102 may be prepared for processing in any suitable manner. For example, desired composition and/or component parameters can be achieved through a variety of chemical and/or physical processing stages, the choice of which will depend upon the operating parameters of the chosen processing scheme, equipment cost and material specifications. For example, feed stream 102 may undergo comminution, blending, and/or slurry formation, as well as chemical and/or physical conditioning. Such preparation efforts may include, for example, sulfur-bearing material feed stream 102 being combined with solution, for example, pregnant leach solution (PLS) or barren raffinate solution from an existing acid heap leaching operation or an agitated tank leaching operation, in a repulp process to produce a slurry.

With continued referenced to FIG. 1, preferably sulfur-bearing material feed stream 102 (or slurry) is suitably combined with a fluid 14, preferably water, and suitable amounts of an oxygenating supply, for example, oxygen 12, optionally with one or more dispersing agents 16 to facilitate pressure leaching (step 104) of sulfur-bearing material feed stream 102. In accordance with one aspect of the present invention, the feed slurry containing sulfur-bearing material 102 may be formed in any suitable mixing vessel or by in-line blending. Other additives, such as wetting agents or the like, for example, lignosulfonates, may also be used.

As those skilled in the art will understand, elemental sulfur is optimally oxidized to sulfuric acid according to the following reaction:

Further, as those skilled in the art will appreciate, this reaction may proceed more completely as temperature is increased. In addition, where the sulfur-bearing material feed 102 comprises hematite and/or other iron-bearing materials, basic iron sulfate may be formed during pressure leaching according to the following reaction:

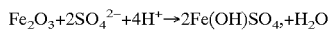

When basic iron sulfate is formed, acid is consumed and subsequent metal recovery may be inhibited. As such, to enable efficient acid production and to optimize metal recovery, the pulp density of the feed provided to the pressure leaching vessel should be controlled.

In accordance with various aspects of the present invention, suitable amounts of water 14 and oxygen 12 are advantageously provided to feed stream 102 to facilitate the reaction of elemental sulfur and sulfide sulfur to sulfuric acid. Further, the feed slurry (i.e., sulfur-bearing material 102) provided for pressure leaching, in accordance with various aspects of the present invention, preferably contains sulfur and other materials, including, without limitation, metal values such as copper, molybdenum, precious metals and the like.

Sulfur-bearing material feed 102 provided to pressure leaching vessel 104 preferably has a percent solids ranging from about 2 to about 20 percent, more preferably on the order of about 3 to about 8 percent solids. In some cases, feed 102 may preferably be combined with additional elemental sulfur, such as from an external source, and in such cases higher percent solids may be tolerated. Where feed 102 includes a significant amount of iron, then the acid concentration of the material in pressure leaching vessel 104 is advantageously controlled to from about 20 to about 50 grams per liter, and more preferably in the range of about 30 to about 40 grams per liter acid.

With continued reference to FIG. 1, after sulfur-bearing material feed stream 102 has been suitably prepared, it is subjected to processing, preferably pressure leaching processing, and more preferably high temperature pressure leaching. As used herein, the term "pressure leaching" refers to a process in which the sulfur-bearing material is contacted with oxygen under conditions of elevated temperature and pressure. During pressure leaching, the elemental sulfur of the sulfur-bearing material 102 and many of the metal sulfides contained in feed 102 are oxidized to form sulfate and dissolved metal ions in solution. In some cases, significant metal values may remain in the solid residue including precious metals, molybdenum and others.

The pressure leaching processes suitably employed in connection with the present invention are generally dependent upon, among other things, temperature, oxygen availability, and process chemistry. While various parameters of each may be utilized, in accordance with preferred aspects of the present invention, the temperature during pressure leaching preferably is maintained above about 220° C., and more preferably in the range of about 235° C. to about 275° C., and optimally in the range of about 250° C.

The duration of pressure leaching in any particular application depends upon a number of factors, including, for example, the characteristics of the feed material (e.g., sulfur-bearing material feed stream 102) and the pressure leaching process pressure and temperature. Preferably, the duration of pressure leaching in accordance with various aspects of the present invention ranges from about 0.5 to about 3 or more hours, and optimally is on the order of about one hour.

While any reactor vessel for pressure leaching may be used, preferably an agitated, multiple-compartment pressure leaching vessel is employed. For example, any pressure containment or pressure controlled system may be used. Agitation may be accomplished in any conventional manner, and preferably is sufficient to suitably disperse sulfur-bearing material feed stream 102, as well as any other additives within the pressure leaching vessel.

The present inventors have found that to prevent the formation of sulfur agglomerates, the temperature in the pressure-leaching vessel preferably should be maintained above about 220° C., and more preferably above about 235° C. and most preferably about 250° C. Moreover, the present inventors have found that the optional addition of certain dispersants and/or particulate matter, for example, ground sand and the like, facilitates enhanced sulfuric acid recovery as well as enhanced metal value recovery, especially precious metal recovery.

Figure 3:
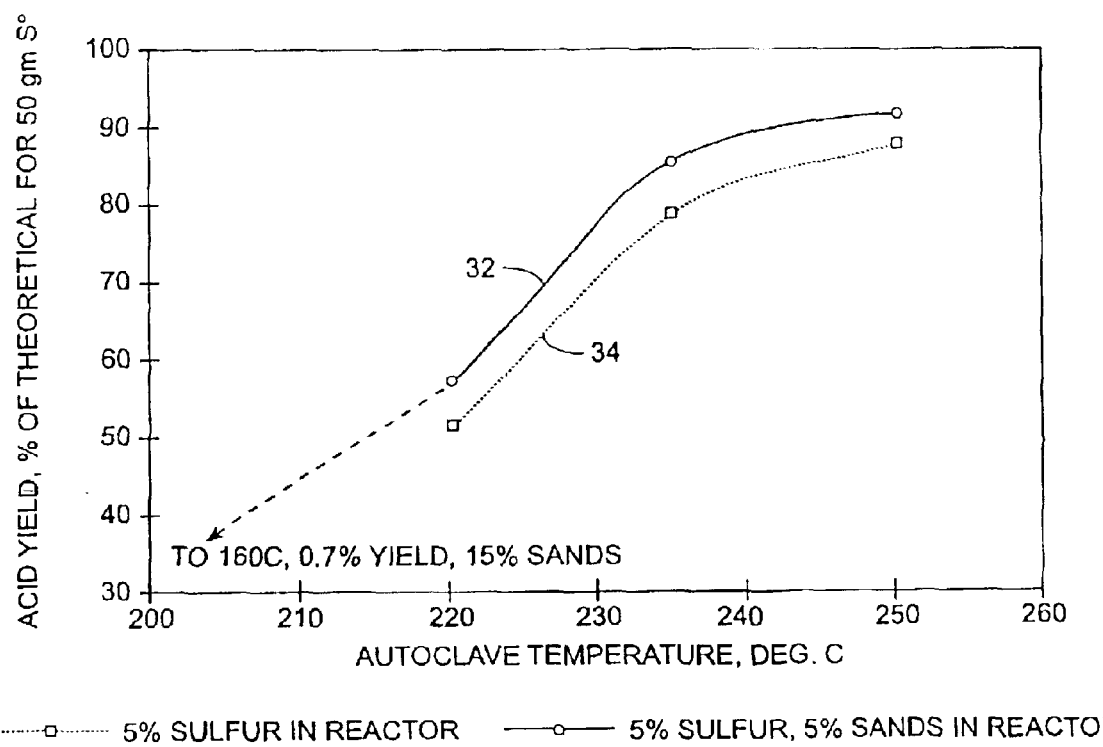

With momentary reference to FIG. 3, the difficulties occasioned by sulfur can be addressed through use of elevated temperature, for example through the use of elevated temperatures in the range of about 250° C. and/or with the use of various dispersants. For example, as shown, the use of ground sand as a dispersant tends to enhance acid yield. As such, in accordance with an optional aspect of the present invention, a dispersing agent is added to sulfur-bearing material feed stream 102 either during formation of the feed slurry or to the pressure leaching vessel used in pressure leaching step 104. Suitable dispersants include any substantially inert particle, such as ground sand or mineral processing tailings, or other particles that tend to provide for the adherence of sulfur and increase the exposed surface area of the sulfur to be oxidized. Other suitable dispersants may include recycled pressure leaching residue, precious metal recovery residues (e.g., cyanidation tailings) or the like. In general, any material now known or hereafter devised by those skilled in the art which advantageously serve such purposes may be used.

During pressure leaching 104, oxygen is added to the pressure leaching vessel, preferably substantially continuously, to maintain the oxygen overpressure at optimal levels for the desired chemical reactions to proceed. That is, sufficient oxygen is suitably injected to maintain an oxygen partial pressure in the pressure leaching vessel ranging from about 50 to about 150 psig. The total pressure in the sealed pressure leaching vessel is preferably from about 600 to about 800 psig.

In any event, in accordance with various aspects of the present invention, a product a slurry is preferably obtained from pressure leaching processing 104 in a conventional manner. Prior to subsequent processing, the resultant product slurry is preferably caused to achieve approximately ambient conditions of pressure and temperature. For example, the product slurry may be flashed to release pressure and to evaporatively cool the slurry through the release of steam.

However, the temperature and pressure of the product slurry may be advantageously reduced in any manner now known or hereafter devised.

In accordance with various preferred aspects of the present invention, once the temperature and pressure of the product slurry is appropriately reduced, preferably, one or more solid-liquid phase separation stages (step 106) may be used to separate the sulfuric acid solution from the solid particles in the product slurry. This may be accomplished in any conventional manner, including use of filtration systems, counter-current decantation (CCD) circuits, thickeners, and the like. A variety of factors, such as the process material balance, environmental regulations, residue composition, economic considerations, and the like, may affect the decision whether to employ a CCD circuit, a thickener, a filter, or any other suitable device in a solid-liquid separation stage. However, it should be appreciated that any technique for conditioning the product slurry is within the scope of the present invention. The product slurry is subjected to solid-liquid phase separation (step 106) to yield a resultant liquid phase sulfuric acid solution 108 and a solid phase residue 18.

Preferably, solid-liquid phase separation (step 106) is accomplished through the use of multiple stages of counter current decantation (CCD) washing. Wash solution and a suitable flocculant may be added as desired.

Sulfuric acid solution 108 may be used in a number of ways. For example, all or a portion of solution 108 may be used in other processing operations. The production of sulfuric acid in this manner may advantageously reduce costs typically associated with acid procurement for such processing operations. Such processing operations may include, among other things, acid-consuming heap leaching operations used in connection with pressure leaching operations or otherwise, agitated tank leaching, combinations thereof or other processing operations.

On the other hand, the solid residue 18 obtained from solid-liquid phase separation (step 106) may be further processed. For example, with continued reference to FIG. 1, if the metal content of the washed solids from solid-liquid separation step 106 is sufficiently high to warrant further processing, the metals contained therein may be recovered through conventional means such as, for example, through smelting or established metal recovery processing (e.g., precious metal recovery), a preferred process for which will be described in greater detail hereinbelow in connection with FIG. 2. If, however, the metals content of residue 18 is too low to justify further treatment, the residue may be sent to an impoundment area (not shown).

Figure 2:
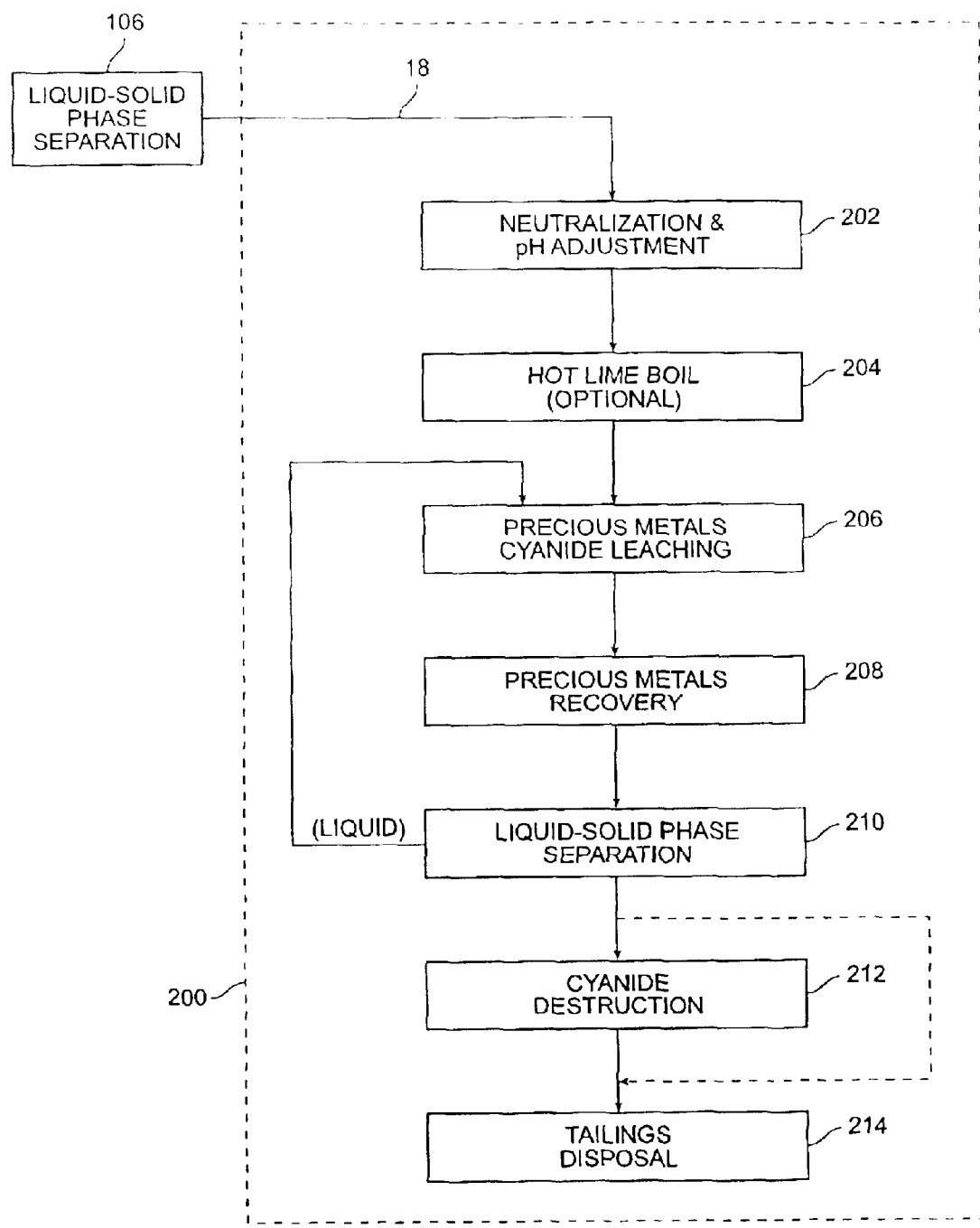
FIG. 2 illustrates a flow diagram of further processing in accordance with the embodiment of the present invention illustrated in FIG. 1; and, FIG. 3 illustrates a graphical profile of sulfuric acid yield versus temperature in accordance with various embodiments of the present invention.

Referring now to FIG. 2, residue 18 from liquid-solid phase separation step 106 (FIG. 1) may be subjected to various further processing to recover metals contained therein, particularly precious metals, such as gold and silver, which may exist in the residue. Depending on the characteristics of residue 18, it may be advantageous to subject it to neutralization and/or pH adjustment, such as is illustrated in step 202. The residue once so treated may then be subjected to further processing or otherwise utilized. Such processing may include, with continued reference to FIG. 2, an optional hot lime boil (step 204) followed by precious metal recovery (step 208), such as through the use of conventional cyanide leaching (step 206) followed by liquid-solid phase separation (step 210). If cyanide leaching is used, the resultant tailings may be recycled and utilized elsewhere in connection with a hydrometallurgical process, for example as a sulfur dispersant, (not shown), Typically after the cyanide is destroyed (step 212). Alternatively, the tailings may be disposed (step 214). As those skilled in the art will recognize, any number of precious metal or other metal recovery methods may be suitable to achieve the objective of recovering metals, such as precious metals (e.g., silver and gold) from residue stream 18, and therefore alternative processing routes may be successfully utilized.

The Examples set forth hereinbelow are illustrative of various aspects of certain preferred embodiments of the present invention. The process conditions and parameters reflected therein are intended to exemplify various aspects of the invention, and are not intended to limit the scope of the claimed invention.

EXAMPLE 1

Various sulfur pressure leaching tests were performed. A Parr batch 2.0 liter pressure leaching vessel was utilized. In each instance, elemental sulfur was combined in the pressure leaching vessel with oxygen and water to form a slurry, and the slurry was contained in a non-adhesive liner. The reaction temperature was varied as shown in Table 1. In each instance, the reaction was permitted to operate for one hour. Fifty grams of sulfur with 100 psi oxygen overpressure were provided.

Yields were obtained by observing the amount of acid produced as compared to the amount of elemental sulfur provided (a theoretical yield of 100% was calculated to represent 3.06 grams $H_2SO_4$/g sulfur).

As can be seen from the results shown in Table 1, enhanced acid yields were obtainable with enhanced temperature and the utilization of a dispersant, such as ground sand, mineral processing tailings, or other suitable material.

TABLE 1

| | | | | | $O_2$ Usage | | $H_2SO_4$ | | |
|---|---|---|---|---|---|---|---|---|---|
| Test | Temp. (° C.) | Time (min.) | % S° | % Sand | g $O_2$/g reacted S° | % of theoretical 1.5 g/g S° | Strength (g/L) | Yield g/g S° | % |
| A | 160 | 65 | 5 | 15 | 5.08 | 339 | 1.6 | 0.02 | 0.7 |
| B | 220 | 60 | 5 | 0 | 1.88 | 126 | 69 | 1.55 | 50.8 |
| C | 220 | 60 | 5 | 5 | 1.78 | n/a | 84 | 1.75 | 57.1 |
| D | 235 | 55 | 5 | 0 | 1.88 | 126 | 114 | 2.38 | 77.4 |
| E | 235 | 60 | 5 | 5 | 1.82 | 122 | 121 | 2.63 | 86.0 |
| F | 250 | 60 | 5 | 0 | 1.92 | 128 | 129 | 2.70 | 88.4 |
| G | 250 | 60 | 5 | 5 | 2.08 | 139 | 134 | 2.83 | 92.4 |

EXAMPLE 2

A medium temperature pressure leaching residue containing 23.8 wt % elemental sulfur was prepared for pressure leaching by making a feed slurry having 10.4 wt % solids with synthetic raffinate and water. The feed was provided to a stirred 2.0 liter Parr pressure leaching vessel at 225° C. with 50 psi oxygen overpressure for 60 minutes. The resulting solution contained 55.9 g/L free acid and a bulk residue (containing 2.9% elemental sulfur and 5.1% sulfate). Precious metals were recovered from the residue in acceptable quantities(i.e., 88% gold and 99% silver extraction).

The graphical profile of FIG. 3 further illustrates the benefits on sulfuric acid yield as a function of temperature and dispersant addition in accordance with various embodiments of the present invention. These results generally indicate that sulfuric acid production increases with increasing temperature. Moreover, the comparison of Curve 32 versus Curve 34 illustrates sulfuric acid yield can be enhanced, on the order of between about 5 and about 10%, with the addition of a suitable dispersant, for example, ground sand.

An effective and efficient method of producing sulfuric acid from an elemental sulfur-bearing material has been presented herein. The use of a dispersing agent as well as elevated temperatures during pressure leaching may aid in alleviating processing problems caused by the high viscosity of elemental sulfur. Further, the present inventors have advanced the art of copper hydrometallurgy by recognizing the advantages of not only producing sulfuric acid solution from sulfur-bearing materials, such as by-products of medium temperature pressure leaching of copper sulfide minerals, but also enabling the recovery of metals, such as precious metals, entrained therein, which otherwise may have been lost.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. These and other changes or modifications are intended to be included within the scope of the present invention, as expressed in the following claims.

What is claimed is:

1. A treatment process comprising the steps of:
   a) providing a feed stream comprising an elemental sulfur-bearing material and a dispersant, wherein said elemental sulfur-bearing material comprises an elemental sulfur-containing residue from a pressure leaching operation;
   b) pressure leaching at least a portion of said feed stream at a temperature in the range of about 220° C. to about 275° C. in an oxygen-containing atmosphere in an agitated multiple-compartment pressure leaching vessel to form a product slurry comprising a sulfuric acid solution;
   c) separating at least a portion of said sulfuric acid solution from said product slurry to yield a residue;
   d) recovering at least one metal value from said residue.

2. The process of claim 1, wherein said elemental sulfur-bearing material comprises an elemental sulfur-containing residue from a pressure leaching operation carried out at a temperature in the range of about 140° C. to about 180° C.

3. The process of claim 1 wherein said step of recovering metal values from said residue comprises recovering at least one precious metal from said residue.

4. The process of claim 1 wherein said step of pressure leaching at least a portion of said feed stream comprises pressure leaching at temperatures above about 235° C.

5. The process of claim 1 wherein said step of providing a feed stream comprising an elemental sulfur-bearing material and a dispersant comprises providing a feed stream comprising an elemental sulfur-bearing material and a sufficient amount of ground sand or mineral processing tailings.

6. A treatment process comprising the steps of:
   a) providing a feed stream comprising an elemental sulfur-bearing material, wherein said elemental sulfur-bearing material comprises an elemental sulfur-containing residue from a pressure leaching operation;
   b) pressure leaching at least a portion of said feed stream in the presence of a dispersant at a temperature in the range of about 220° C. to about 275° C. in an oxygen-containing atmosphere in an agitated multiple-compartment pressure leaching vessel to form a product slurry comprising a sulfuric acid solution;
   c) separating at least a portion of said sulfuric acid solution from said product slurry to yield a residue;
   d) recovering at least one metal value from said residue.

7. The process of claim 6, wherein said elemental sulfur-bearing material comprises an elemental sulfur-containing residue from a pressure leaching operation carried out at a temperature in the range of about 140° C. to about 180° C.

8. The process of claim 6 wherein said step of recovering metal values from said residue comprises recovering at least one precious metal from said residue.

9. The process of claim 6 wherein said step of pressure leaching at least a portion of said feed stream in the presence of a dispersant comprises pressure leaching at least a portion of said feed stream in the presence of a sufficient amount of ground sand or mineral processing tailings.

10. A process for recovering metal values from an elemental sulfur-bearing solid residue of a pressure leaching process carried out at a temperature in the range of about 140° C. to about 180° C., the process comprising the steps of:
    a) comminuting the elemental sulfur-bearing solid residue from the pressure leaching process carried out at a temperature in the range of about 140° C. to about 180° C. to produce a feed material;
    b) forming a feed slurry by combining said feed material with a dispersant and a sufficient amount of fluid medium;
    c) pressure leaching at least a portion of said feed slurry at a temperature in the range of about 220° C. to about 275° C. in an oxygen-containing atmosphere to yield a pressure leach product slurry comprising a sulfuric acid solution;
    d) reducing the temperature and pressure of said product slurry;
    e) separating at least a portion of said sulfuric acid solution from said product slurry to yield a solid residue;
    f) recovering at least one metal value from said solid residue.

11. The process of claim 10 wherein said step of recovering at least one metal value from said solid residue comprises recovering one or more precious metals contained in said residue.

12. The process of claim 10 wherein said step of reducing the temperature and pressure of said product slurry comprises flashing said product slurry.

13. The process of claim 10, said process further comprising the step of utilizing at least a portion of said sulfuric acid solution in connection with other processing operations.

14. The process of claim 10 wherein said step of pressure leaching at least a portion of said feed slurry is conducted at a temperature in the range in excess of about 235° C.

15. The process of claim 10 wherein said step of forming a feed slurry comprises combining said feed material with a sufficient amount of ground sand or mineral processing tailings.

16. A process for the production of sulfuric acid and recovery of precious metals from an elemental sulfur-bearing material comprising the steps of:
    a) providing an elemental sulfur-bearing material, wherein said elemental sulfur-bearing material comprises an elemental sulfur-containing residue from a pressure leaching operation;

b) pressure leaching said elemental sulfur-bearing material at a temperature in the range of about 220° C. to about 275° C. in an oxygen-containing atmosphere in an, agitated multiple-compartment pressure leaching vessel to form a product slurry comprising a sulfuric acid solution;

c) adding a dispersant during said pressure leaching step;

d) separating at least a portion of said sulfuric acid solution from said product slurry to yield a solid residue;

e) recovering at least one precious metal value from said solid residue.

17. The process of claim 16 wherein said step of providing an elemental sulfur-bearing material comprises providing an elemental sulfur-containing residue from a pressure leaching operation carried out at a temperature in the range of about 140° C. to about 180° C.

18. The process of claim 16 wherein said step of pressure leaching comprises pressure leaching at a temperature of about 235° C.

* * * * *